(12) United States Patent
Chou et al.

(10) Patent No.: US 11,102,086 B2
(45) Date of Patent: Aug. 24, 2021

(54) METHODS AND SYSTEMS FOR INSTANTIATING AND CONNECTING RADIO ACCESS NETWORK VIRTUALIZED NETWORK FUNCTION AND CORE NETWORK VIRTUALIZED NETWORK FUNCTION

(71) Applicant: Apple Inc., Cupertino, CA (US)

(72) Inventors: Joey Chou, Scottsdale, AZ (US); Yizhi Yao, Chandler, AZ (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/484,790

(22) PCT Filed: Mar. 12, 2018

(86) PCT No.: PCT/US2018/022055
§ 371 (c)(1),
(2) Date: Aug. 8, 2019

(87) PCT Pub. No.: WO2018/169883
PCT Pub. Date: Sep. 20, 2018

(65) Prior Publication Data
US 2019/0363953 A1    Nov. 28, 2019

Related U.S. Application Data

(60) Provisional application No. 62/471,238, filed on Mar. 14, 2017.

(51) Int. Cl.
*G06F 15/173* (2006.01)
*H04L 12/24* (2006.01)
(Continued)

(52) U.S. Cl.
CPC .......... *H04L 41/5041* (2013.01); *H04L 41/12* (2013.01); *H04L 41/5077* (2013.01); *H04W 16/18* (2013.01); *H04W 28/16* (2013.01)

(58) Field of Classification Search
None
See application file for complete search history.

(56) References Cited

U.S. PATENT DOCUMENTS

2016/0337172 A1* 11/2016 Yu ........................... H04L 67/34
2017/0012823 A1*  1/2017 Zhu ....................... H04W 28/08
2018/0316730 A1* 11/2018 Schaefer ............. H04L 41/0803

OTHER PUBLICATIONS

International Patent Office—International Search Report and Written Opinion dated Jun. 12, 2018, from International Application No. PCT/US2018/022055, 16 pages.
(Continued)

*Primary Examiner* — Quang N Nguyen
(74) *Attorney, Agent, or Firm* — Fish & Richardson P.C.

(57) ABSTRACT

Examples provide an apparatus for instantiating a Network Service containing a Virtualised Network Function that is part of a Core Network, and a Virtualised Network Function that is part of a next generation Node B, gNB, comprising a Network Function Virtualisation Orchestrator, NFVO, operable to: receive a request to instantiate a new Network Service from a Network Manager; instantiate the Network Service containing the Virtualised Network Function that is part of the Core Network, and the Virtualised Network Function that is part of the gNB; and respond to the Network Manager indicating that the requested new Network Service has been instantiated. In other examples, there is provided a computer implemented method for instantiating a Network Service.

20 Claims, 4 Drawing Sheets

(51) Int. Cl.
*H04W 16/18* (2009.01)
*H04W 28/16* (2009.01)

(56) References Cited

OTHER PUBLICATIONS

Intel, "pCR TR 32.864 add UCs on instantiation of NS containing VNF and/or PNF," 3GPP TSG SA WG5 (Telecom Management) Meeting #111, S5-171073, Agenda item: 6.5.9, Jan. 16-20, 2017, Porto, Portugal, 4 pages.

Intel, "pCR TR 32.864 add UC on NS update to instantiate a new VNF instance or add a PNF instance," 3GPP TSG SA WG5 (Telecom Management) Meeting #111, S5-171074, Agenda item: 6.5.9, Jan. 16-20, 2017, Porto, Portugal, 3 pages.

3GPP, "Technical Specification Group Services and System Aspects; Telecommunication management; Study on management aspects of virtualized network functions that are part of the New Radio (NR) (Release 15)," 3GPP TR 32.864 V0.2.0 (207-02), Lte Advanced Pro, 10 pages.

3GPP, "Technical Specification Group Radio Access Network; Study on New Radio Access Technology; Radio Access Architecture and Interfaces (Release 14)," 3GPP TR 38.801 V2.0.0 (Mar. 2017), Lte Advanced Pro, 90 pages.

ETSI, "Network Functions Virtualisation (NFV); Management and Orchestration; Os-Ma-Nfvo reference point—Interface and Information Model Specification," ETSI GS NFV-IFA 013 V2.1.1 (Oct. 2016), 127 pages.

3GPP, "Technical Specification Group Services and System Aspects; Telecommunication management; Life Cycle Management (LCM) for mobile networks that include virtualized network functions; Procedures (Release 14)," 3GPP TS 28.526 V1.0.0 (Mar. 2017), Lte Advanced Pro, 36 pages.

SA5, "Presentation of Specification to TSG: TS 28.525 Lifecycle Management (LCM) for mobile networks that include virtualized network functions; Requirements, Version 2.0.0," 3GPP TSG-SA Meeting #75, Tdoc SP-170120, Mar. 8-10, 2017, Dubrovnik, HR, 1 page.

3GPP, "Technical Specification Group Services and System Aspects; Telecommunication management; Life Cycle Management (LCM) for mobile networks that include virtualized network functions; Requirements 3GPP TS 28.525 V2.0.0 (Mar. 2017), (Release 14)," Lte Advanced Pro, 46 pages.

\* cited by examiner ive Unit (i.e. an upper layer of a Next Generation Radio Access Network Basestation (BS)) and one or more Distributed Unit(s) (i.e. a lower layer of a Next Generation Radio Access Network Basestation (BS)). TR 38.801 also states that "NR shall allow Centralized Unit (CU) deployment with Network Function Virtualization (NFV)." Therefore, a next generation NodeB (gNB) may compose a Centralized Unit that is implemented as a Virtualised Network Function (VNF) running in the cloud, and a Distributed Unit(s) that is implemented as a Physical Network Function (PNF) running in or at the cell site that may provide wireless communication to the user equipment (UE).

METHODS AND SYSTEMS FOR INSTANTIATING AND CONNECTING RADIO ACCESS NETWORK VIRTUALIZED NETWORK FUNCTION AND CORE NETWORK VIRTUALIZED NETWORK FUNCTION

CROSS REFERENCE TO RELATED APPLICATION

The present application is a national phase entry under 35 U.S.C. § 371 of International Application No. PCT/US2018/022055, filed Mar. 12, 2018, entitled "METHODS AND SYSTEMS FOR INSTANTIATING AND CONNECTING RADIO ACCESS NETWORK VIRTUALIZED NETWORK FUNCTION AND CORE NETWORK VIRTUALIZED NETWORK FUNCTION," which claims priority to U.S. Provisional Patent Application No. 62/471,238, filed Mar. 14, 2017, entitled "METHODS AND SYSTEMS FOR INSTANTIATING AND CONNECTING RADIO ACCESS NETWORK VIRTUALIZED NETWORK FUNCTION AND CORE NETWORK VIRTUALIZED NETWORK FUNCTION," the entire disclosures of which are hereby incorporated by reference.

BACKGROUND

Various embodiments generally may relate to the field of wireless communications.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Document Third Generation Partnership Project (3GPP) technical report (TR) 38.801 V2.0.0 (2017 March) is hereby incorporated by reference in its entirety.

Example embodiments according to the present disclosure include the function split feature that is to split a Next Generation Radio Access Network (also referred to as "NG-RAN", New Radio "NR" and the like) into a Central- In Network Functions Virtualisation (NFV), the instantiation of a Network Service (NS) is to contain all the Virtualised Network Function and Physical Network Function parameters needed to form a mobile network.

Various embodiments discussed herein provide one or more of the following: Instantiate a Virtualised Network Function that is part of the Core Network (CN), and a Virtualised Network Function that is part of the next generation NodeB (gNB); Configure the relation between a Virtualised Network Function that is part of the Core Network, and a Virtualised Network Function that is part of the gNB; Add Virtualised Network Function Forwarding Graph(s) (VNFFGs) to connect Virtualised Network Function instances that are contained in a Network Service.

Figure 1:
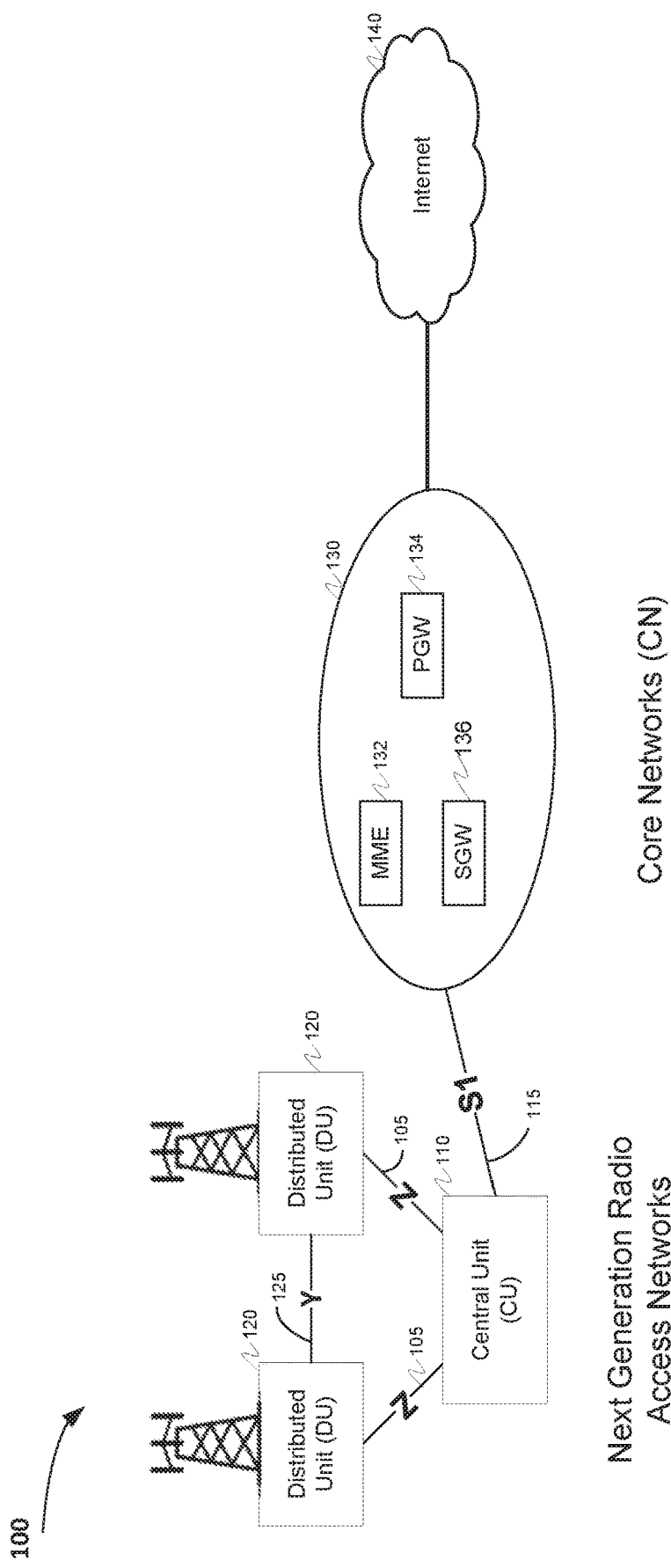
FIG. 1 shows a mobile network architecture in accordance with some embodiments.

FIG. 1 shows a New Radio (NR) mobile network architecture 100 that includes a Next Generation Radio Access Network comprising a Centralized Unit 110 that is implemented as a Virtualised Network Function running in the cloud, and Distributed Units 120 running in the cell site that provide wireless communication to the UE, and the core networks 130.

In the example embodiment shown, the Distributed Units 120 are connected to one another via interface Y, 125, and the Distributed Units 120 are connected to the Centralized Unit 110 via interfaces Z, 105. The Centralized Unit 110 is connected to the Core Network 130 via interface 51, 115. The Core Network 130 includes an Mobility Management Entity (MME) 132, a Packet Data Network (PDN) Gateway (PGW) 134 and a Serving Gateway (SGW) 136, which together operate to provide the Core Network 130 functionality. The Core Network 130 is connected to the wider Internet 140.

Figure 2:
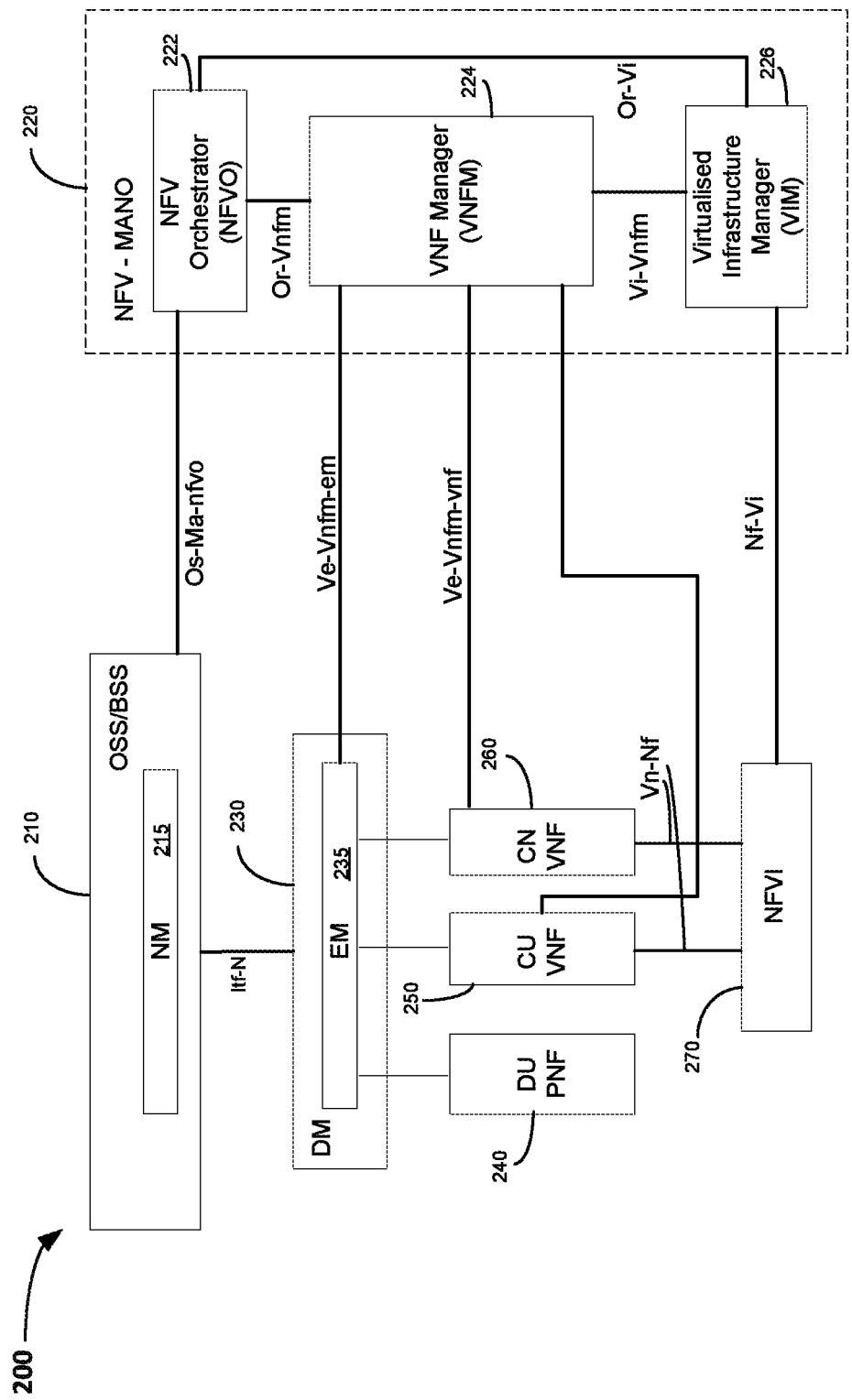
FIG. 2 shows the 3GPP and ETSI Network Functions Virtualisation management architecture in accordance with some embodiments.

FIG. 2 shows the 3GPP and ETSI Network Functions Virtualisation management architecture 200 that is used to support the lifecycle management of Virtualised Network Function(s) and Physical Network Function(s).

In the example embodiment shown, an Operations Support System/Business Support System (OSS/BSS) 210 contains a Network Manager 215. A Network Functions Virtualisation Manager and Orchestrator (NFV-MANO) 220 contains a Network Functions Virtualisation Orchestrator (NFVO) 222, a Virtualised Network Function Manager (VNFM) 224 and a Virtualised Infrastructure Manager (VIM) 226. The Network Functions Virtualisation Orchestrator 222 is communicatively coupled to the Operations Support System/Business Support System 210 by the interface Os-Ma-nfvo. The Network Functions Virtualisation Orchestrator 222 is communicatively coupled to the Virtualised Network Function Manager 224 by the interface Or-Vnfm. The Network Functions Virtualisation Orchestrator 222 is further communicatively coupled to the Virtualised Infrastructure Manager 226 by the interface Or-Vi. The Virtualised Network Function Manager 224 is communicatively coupled to the Virtualised Infrastructure Manager 226 by the interface Vi-Vnfm. The ETSI Network Functions Virtualisation management architecture 200 also comprises a Device Manager (DM) 230 containing an Element Manager 235. The Device Manager 230 is communicatively coupled to the Operations Support System/Business Support System 210 over interface Itf-N. The Element Manager 235 is communicatively coupled to the Virtualised Network Function Manager 224 by interface Ve-Vnfm-em. Distributed Unit Physical Network Function(s) 240 are communicatively coupled to the Element Manager 235. Centralized Unit Virtualised Network Function(s) 250 (i.e. the Virtualised Network Function that is part of the next gNB) are communicatively coupled to the Element Manager 235, and are further communicatively coupled to the Virtualised Network Function Manager 224 by the interface Ve-Vnfm-vnf. A Core Network Virtualised Network Function 260 is communicatively coupled to the Element Manager 235, and is further communicatively coupled to the Virtualised Network Function Manager 224 by the interface Ve-Vnfm-vnf. A Network Functions Virtualisation Infrastructure 270 is communicatively coupled to the Centralized Unit Virtualised Network Function(s) 250 and the Core Network Virtualised Network Function 260 via interface(s) Vn-Nf. The Network Functions Virtualisation Infrastructure 270 is further communicatively coupled to the Virtualised Infrastructure Manager 226 by the interface Nf-Vi.

There now follows a detailed description of a number of example usage scenarios according to example embodiments of the present disclosure.

Instantiation of a Network Service containing a Virtualised Network Function that is part of the Core Network and a Virtualised Network Function that is part of the gNB. 3GPP technical specification (TS) 28.525 only includes the instantiation of Virtualised Network Function that is part of the Core Network 260, since the Radio Access Network (RAN) node was not in the scope of TS 28.525 at the time. A Centralized Unit that is part of a gNB can be virtualised; therefore, a Centralized Unit can be implemented as the Virtualised Network Function 250, and can be connected to the Virtualised Network Function that is part of the Core Network 260. Pre-conditions: in some embodiments, that the Network Service Descriptor (NSD) for the Network Service containing the Virtualised Network Function that is part of the Core Network 260 and Virtualised Network Function that is part of the gNB has been on-boarded and enabled; in some embodiments, that the Virtualised Network Function package for the Virtualised Network Function that is part of the Core Network 260 has been on-boarded and enabled; in some embodiments, that the Virtualised Network Function package for the Virtualised Network Function that is part of the gNB has been on-boarded and enabled. Embodiments: in some embodiments, the Network Manager (NM) 215 requests the Network Functions Virtualisation Orchestrator (NFVO) 222 to instantiate the Network Service containing the Virtualised Network Function that is part of the Core Network 260 and the Virtualised Network Function that is part of the gNB (see clause 7.3.3 in GS NFV-IFA013 V2.1.1 (2016 October)—"Network Function Virtualization (NFV); Management and Orchestration; Os-Ma-nfvo Reference Point—Interface and Information Model Specification, which is hereby incorporated by reference in its entirety); in some embodiments, the Network Functions Virtualisation Orchestrator 222 instantiates the Network Service based on the request received from Network Manager 215; in some embodiments, the Network Functions Virtualisation Orchestrator 222 responds to Network Manager 215 to indicate that the Network Service has been instantiated successfully. Post-conditions: in some embodiments, the Network Service containing the Virtualised Network Function that is part of the Core Network 260 and the Virtualised Network Function that is part of the gNB has been instantiated.

Establishment of relation between the Virtualised Network Function that is part of the Core Network and the Virtualised Network Function that is part of the gNB. in some cases, the reference point between the Virtualised Network Function that is part of the Core Network 260 and the Virtualised Network Function that is part of the gNB needs to be managed. So, it may be necessary to allow the mobile operator to establish the relation, which is the management view of the reference point, between the Virtualised Network Function that is part of the Core Network 260 and the Virtualised Network Function that is part of the gNB. Pre-conditions: in some embodiments, that the Virtualised Network Function that is part of the Core Network 260 has been instantiated; in some embodiments, that the Virtualised Network Function that is part of the gNB has been instantiated; in some embodiments, that the relation between the Virtualised Network Function that is part of the Core Network 260 and the Virtualised Network Function that is part of the gNB has not yet been established. Description: in some embodiments, the Network Manager 215 requests the Element Manager 235 to establish the relation, which is the management view of the reference point, between the Virtualised Network Function that is part of the Core Network 260, and the Virtualised Network Function that is part of the gNB through configuration; in some embodiments, the Element Manager 235 configures the Virtualised Network Function that is part of the Core Network 260, and the Virtualised Network Function that is part of the gNB to establish the relation; in some embodiments, the Element Manager 235 responds to Network Manager 215 to indicate that the relation has been established. Post-conditions: in some embodiments, the relation between the Virtualised Network Function that is part of the Core Network 260, and the Virtualised Network Function that is part of the gNB has been established.

Add Virtualised Network Functions Forwarding Graphs to a Network Service instance containing the Virtualised Network Function instance that is part of gNB. In some cases, a Network Service instance may comprise the Virtualised Network Function instance that is part of a gNB, the Virtualised Network Function Forwarding Graphs (VNFFGs) including the Virtual Links (VLs) to connect the Virtualised Network Function instance that is part of the gNB with other Virtualised Network Function/Physical Network Function instances in the Network Service instance. The Virtual Links could contain some essential information (e.g., quality of service (QoS), connectivity type, etc) for the connections between the Virtualised Network Function instance that is part of gNB and other Virtualised Network Function/Physical Network Function instances. So, operators need to be able to add the Virtualised Network Function Forwarding Graphs to a Network Service instance containing the Virtualised Network Function that is part of gNB. Pre-conditions: in some embodiments, that the Network Service instance containing the Virtualised Network Function instance that is part of the gNB already exists; in some embodiments, that the Virtualised Network Function Forwarding Graphs related to the Virtualised Network Function instance that is part of the gNB are missing in the Network Service instance. Embodiments: in some embodiments, the Network Manager 215 requests Network Functions Virtualisation Orchestrator 222 to add the Virtualised Network Function Forwarding Graphs that include the Virtual Links to connect the Virtualised Network Function instance that is part of the gNB and other Virtualised Network Function/Physical Network Function instances to a Network Service instance (see clause 7.3.5 in GS NFV-IFA013 V2.1.1 (2016 October)), which is hereby incorporated by reference in its entirety; in some embodiments, the Network Functions Virtualisation Orchestrator 222 adds the Virtualised Network Function Forwarding Graphs to the Network Service to connect the Virtualised Network Function instance that is part of the gNB and other Virtualised Network Function/Physical Network Function instances to a Network Service instance; in some embodiments, the Network Functions Virtualisation Orchestrator 222 responds to Network Manager 215 to indicate that the Virtualised Network Function Forwarding Graphs have been added successfully. Postconditions: in some embodiments, the Virtualised Network Function Forwarding Graphs, containing the Virtual Links to connect the Virtualised Network Function instance that is part of the gNB and other Virtualised Network Function/Physical Network Function instances, have been added to the Network Service instance.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 3:
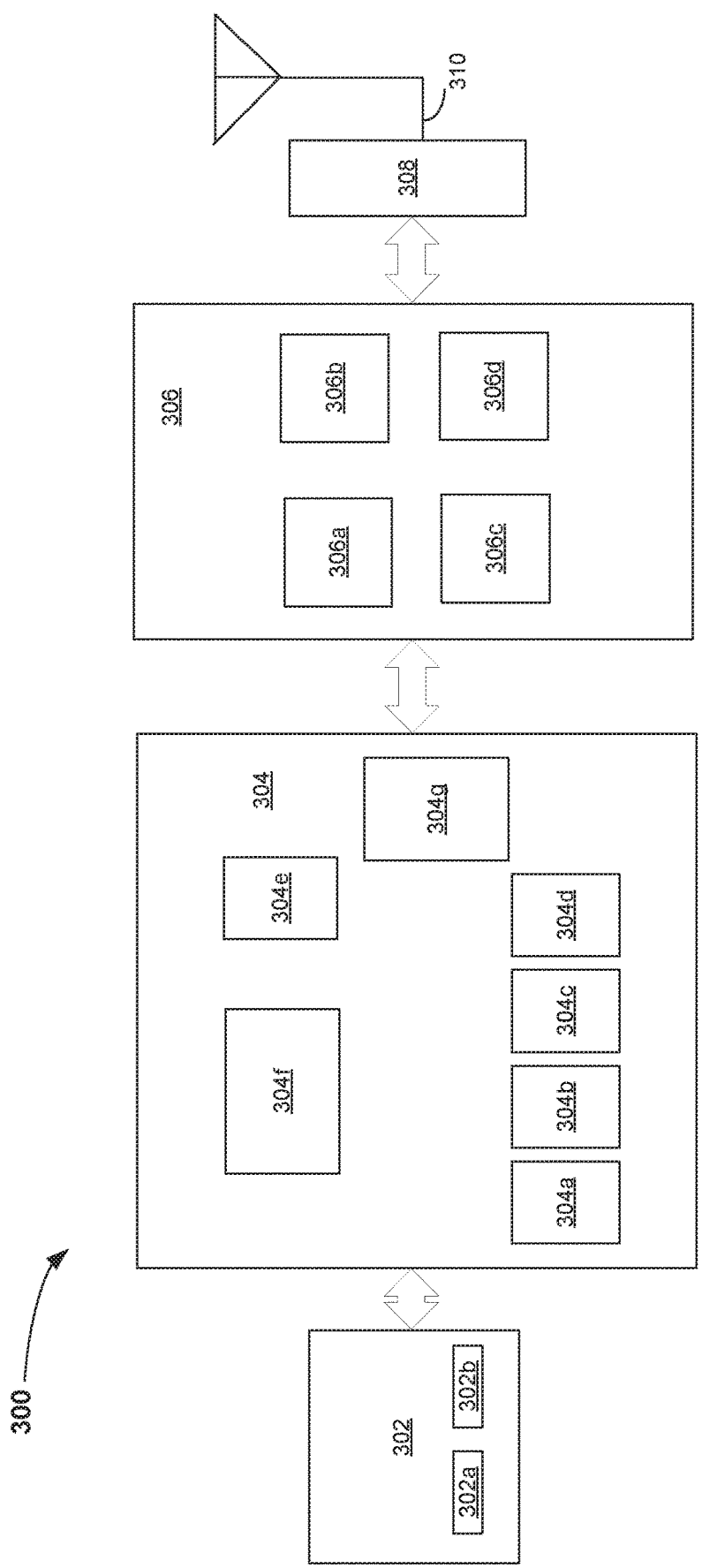
FIG. 3 illustrates an electronic device in accordance with some embodiments.

Embodiments described herein may be implemented into a system using any suitably configured hardware and/or software. FIG. 3 illustrates, for one embodiment, example components of an electronic device 300. In embodiments, the electronic device 300 may be, implement, be incorporated into, or otherwise be a part of a user equipment (UE), an evolved NodeB (eNB), a next generation NodeB (gNB), a Transmission Reception Point (TRP), or any other electronic device. In some embodiments, the electronic device 300 may include application circuitry 302, baseband circuitry 304, Radio Frequency (RF) circuitry 306, front-end module (FEM) circuitry 308 and one or more antennas 310, coupled together at least as shown. In embodiments where the electronic device 300 is implemented in or by an eNB/gNB/TRP, the electronic device 300 may also include network interface circuitry (not shown) for communicating over a wired interface (for example, an X2 interface, an Si interface, and the like).

The application circuitry 302 may include one or more application processors. For example, the application circuitry 302 may include circuitry such as, but not limited to, one or more single-core or multi-core processors 302a. The processor(s) 302a may include any combination of general-purpose processors and dedicated processors (e.g., graphics processors, application processors, etc.). The processors 302a may be coupled with and/or may include computer-readable media 302b (also referred to as "CRM 302b", "memory 302b", "storage 302b", or "memory/storage 302b") and may be configured to execute instructions stored in the CRM 302b to enable various applications and/or operating systems to run on the system.

The baseband circuitry 304 may include circuitry such as, but not limited to, one or more single-core or multi-core processors. The baseband circuitry 304 may include one or more baseband processors and/or control logic to process baseband signals received from a receive signal path of the RF circuitry 306 and to generate baseband signals for a transmit signal path of the RF circuitry 306. Baseband circuity 304 may interface with the application circuitry 302 for generation and processing of the baseband signals and for controlling operations of the RF circuitry 306. For example, in some embodiments, the baseband circuitry 304 may include a second generation (2G) baseband processor 304a, third generation (3G) baseband processor 304b, fourth generation (4G) baseband processor 304c, and/or other baseband processor(s) 304d for other existing generations, generations in development or to be developed in the future (e.g., fifth generation (5G), 6G, etc.). The baseband circuitry 304 (e.g., one or more of baseband processors 304a-d) may handle various radio control functions that enable communication with one or more radio networks via the RF circuitry 306. The radio control functions may include, but are not limited to, signal modulation/demodulation, encoding/decoding, radio frequency shifting, and the like. In some embodiments, modulation/demodulation circuitry of the baseband circuitry 304 may include Fast-Fourier Transform (FFT), precoding, and/or constellation mapping/demapping functionality. In some embodiments, encoding/decoding circuitry of the baseband circuitry 304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 304e of the baseband circuitry 304 may be configured to run elements of the protocol stack for signaling of the PHY, MAC, RLC, PDCP and/or RRC layers. In some embodiments, the baseband circuitry 304 may include one or more audio digital signal processor(s) (DSP) 304f. The audio DSP(s) 304f may include elements for compression/decompression and echo cancellation and may include other suitable processing elements in other embodiments. The baseband circuitry 304 may further include computer-readable media 304g (also referred to as "CRM 304g", "memory 304g", "storage 304g", or "CRM 304g"). The CRM 304g may be used to load and store data and/or instructions for operations performed by the processors of the baseband circuitry 304. CRM 304g for one embodiment may include any combination of suitable volatile memory and/or non-volatile memory. The CRM 304g may include any combination of various levels of memory/storage including, but not limited to, read-only memory (ROM) having embedded software instructions (e.g., firmware), random access memory (e.g., dynamic random access memory (DRAM)), cache, buffers, etc.). The CRM 304g may be shared among the various processors or dedicated to particular processors. Components of the baseband circuitry 304 may be suitably combined in a single chip, a single chipset, or disposed on a same circuit board in some embodiments. In some embodiments, some or all of the constituent components of the baseband circuitry 304 and the application circuitry 302 may be implemented together, such as, for example, on a system on a chip (SOC).

In some embodiments, the baseband circuitry 304 may provide for communication compatible with one or more radio technologies. For example, in some embodiments, the baseband circuitry 304 may support communication with an E-UTRAN and/or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc., to facilitate the communication with the wireless network. RF circuitry 306 may include a receive signal path that may include circuitry to down-convert RF signals received from the FEM circuitry 308 and provide baseband signals to the baseband circuitry 304. RF circuitry 306 may also include a transmit signal path that may include circuitry to up-convert baseband signals provided by the baseband circuitry 304 and provide RF output signals to the FEM circuitry 308 for transmission.

In some embodiments, the RF circuitry 306 may include a receive signal path and a transmit signal path. The receive signal path of the RF circuitry 306 may include mixer circuitry 306a, amplifier circuitry 306b and filter circuitry 306c. The transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 304 and may be filtered by filter circuitry 306c. The filter circuitry 306c may include a low-pass filter (LPF), although the scope of the embodiments is not limited in this respect.

In some embodiments, the mixer circuitry 306a of the receive signal path and the mixer circuitry 306a of the transmit signal path may include two or more mixers and may be arranged for quadrature downconversion and/or upconversion, respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a of the transmit signal path may be arranged for direct downconversion and/or direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306d may be a fractional-N synthesizer or a fractional N/N+1 synthesizer, although the scope of the embodiments is not limited in this respect, as other types of frequency synthesizers may be suitable. For example, synthesizer circuitry 306d may be a delta-sigma synthesizer, a frequency multiplier, or a synthesizer comprising a phase-locked loop with a frequency divider. The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage controlled oscillator (VCO), although that is not a requirement. Divider control input may be provided by either the baseband circuitry 304 or the application circuitry 302 depending on the desired output frequency. In some embodiments, a divider control input (e.g., N) may be determined from a look-up table based on a channel indicated by the application circuitry 302.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

FEM circuitry 308 may include a receive signal path that may include circuitry configured to operate on RF signals received from one or more antennas 310, amplify the received signals and provide the amplified versions of the received signals to the RF circuitry 306 for further processing. FEM circuitry 308 may also include a transmit signal path that may include circuitry configured to amplify signals for transmission provided by the RF circuitry 306 for transmission by one or more of the one or more antennas 310. In some embodiments, the FEM circuitry 308 may include a TX/RX switch to switch between transmit mode and receive mode operation. The FEM circuitry 308 may include a receive signal path and a transmit signal path. The receive signal path of the FEM circuitry may include a low-noise amplifier (LNA) to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310).

In some embodiments, the electronic device 300 may include additional elements such as, for example, a display, a camera, one or more sensors, and/or interface circuitry (for example, input/output (I/O) interfaces or buses) (not shown). In embodiments where the electronic device 300 is implemented in or by an eNB/gNB/TRP, the electronic device 300 may include network interface circuitry. The network interface circuitry may be one or more computer hardware components that connect electronic device 300 to one or more network elements, such as one or more servers within a core network or one or more other eNBs/gNBs/TRPs via a wired connection. To this end, the network interface circuitry may include one or more dedicated processors and/or field programmable gate arrays (FPGAs) to communicate using one or more network communications protocols such as X2 application protocol (AP), Si AP, Stream Control Transmission Protocol (SCTP), Ethernet, Point-to-Point (PPP), Fiber Distributed Data Interface (FDDI), and/or any other suitable network communications protocols.

In some embodiments, the electronic device 300 of FIG. 3 may be configured to perform one or more processes, techniques, and/or methods as described herein, or portions thereof, such as those described by the following examples.

Figure 4:
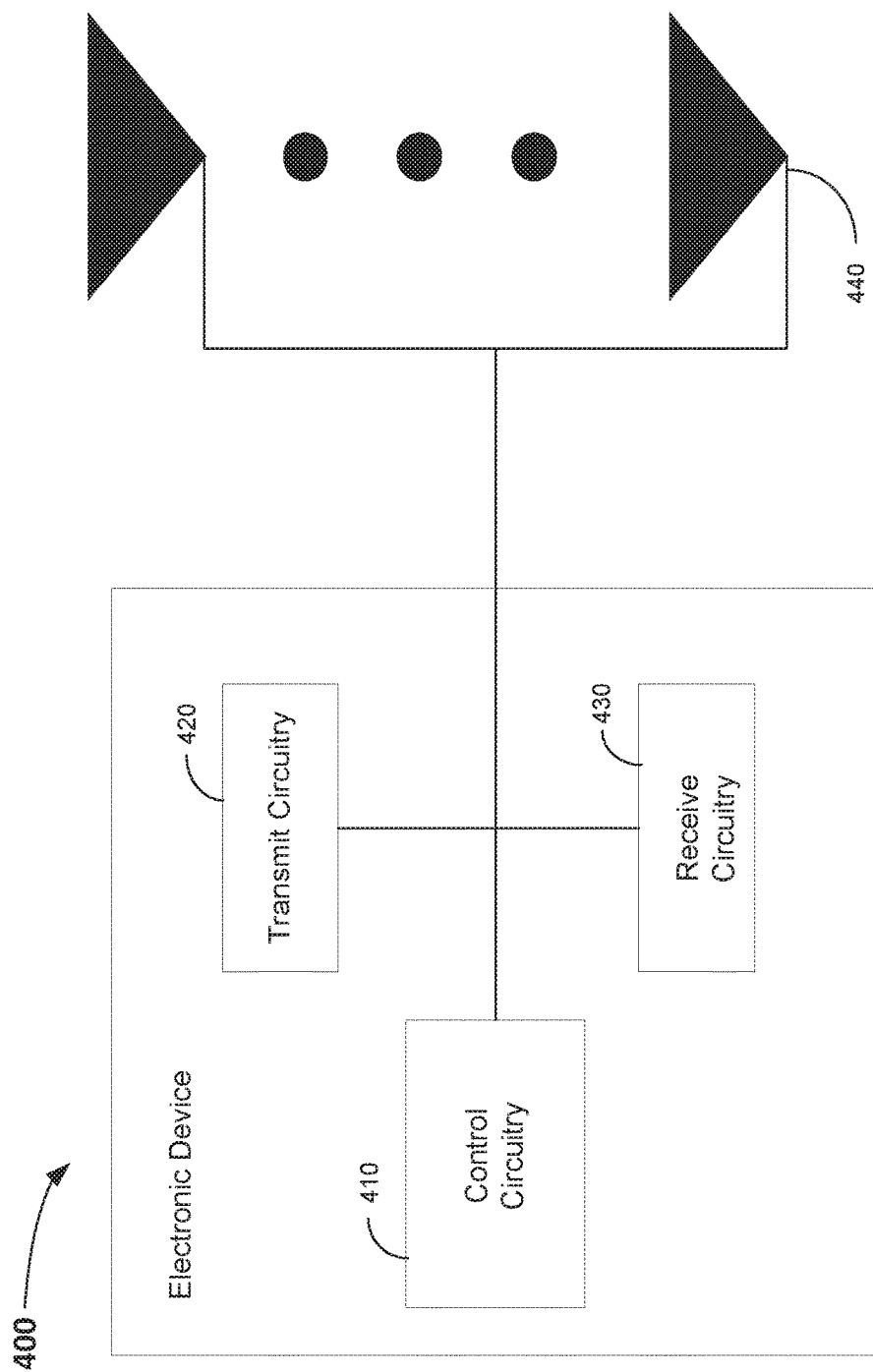
FIG. 4 illustrates an electronic device that may be part of the electronic device of FIG. 3, in accordance with some embodiments.

FIG. 4 illustrates an electronic device that may be part of an electronic device 400 that implements a Network Manager (NM) 215, an Element Manager (EM) 235, a Virtualized Network Function (VNF), a VNF Manager (VNFM) 224, a Virtualized Infrastructure Manager (VIM) 226, Network Function Virtualization (NFV) Infrastructure (NFVI) 270, a NFV Orchestrator (NFVO) 222, and/or any other suitable device (such as those shown by FIGS. 1 and 2 above) in accordance with various embodiments. In embodiments, the electronic device 400 may include control circuitry 410, transmit circuitry 420, and/or receive circuitry 430 which may be coupled to one another. Specifically, the transmit circuitry 420 and receive circuitry 430 may be to transmit and receive, respectively, one or more signals via one or more wireless or wired protocols now known or developed hereafter. The control 410, transmit 420, and/or receive circuitry 430 may be coupled with one or more antennas 440 to wireless transmit and/or receive signals. In some embodiments, the electronic device 400 of FIG. 4 may be implemented in or by the electronic device 300 of FIG. 3, or vice versa.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device 400 circuitry may be implemented in, or functions associated with the circuitry may be implemented by, one or more software or firmware modules.

In some embodiments, the electronic device 400 of FIG. 4 may be configured to perform one or more processes, techniques, and/or methods as described herein, or portions thereof, such as those described by the following examples.

Example 1 may include an apparatus, comprising: a New Radio (NR) RAN node or gNB comprising a Centralized Unit 110 (Upper Layer of New Radio BS) that may be implemented as Virtualized Network Functions (VNF) deployed in the cloud, and Distributed Unit 120 (i.e. Lower Layer of New Radio BS) that may be implemented as vertical hardware deployed in the cell site to provide wireless communication to UE.

Example 2 may include the Network Manager (NM) 215 comprising one or more processors configured to: send a request to NFV Orchestrator (NFVO) 222 to create a new Network Service (NS) containing VNF that is part of the Core Networks (CN) 260 and VNF that is part of the gNB; and receive from NFVO 222 a response indicating the NS have been instantiated successfully; and send a request to NFVO 222 to add the VNFFG (VNF Forwarding Graphs) that include the VLs (Virtual Links) to connect the VNF instance that is part of gNB and other VNF/PNF instances to a NS instance; and receive from NFVO 222 a response indicating the VNFFG have been instantiated successfully.

Example 3 may include the NFVO 222 of example 2 and/or some other examples herein, wherein upon receiving the request from NM 215 to create a new Network Service (NS) containing VNF that is part of the Core Networks (CN) 260 and VNF that is part of the gNB, NFVO 222 is configured to: instantiate the NS, based on the request received from NM 215; and send a response to NM 215 to indicate the NS has been instantiated successfully.

Example 4 may include the NFVO 222 of example 2 and/or some other examples herein, wherein upon receiving a request from NM 215 to add the VNFFG that include the VLs (Virtual Links) to connect the VNF instance that is part of gNB and other VNF/PNF instances to a NS instance, NFVO 222 is configured to: add the VNFFGs to the NS to connect the VNF instance that is part of gNB and other VNF/PNF instances to a NS instance; and send a response to NM 215 to indicate the VNFFGs has been added successfully.

Example 5 may include the Network Manager (NM) 215 comprising one or more processors is configured to: send a request to EM 235 to establish the relation, which is the management view of the reference point, between the VNF that is part of the CN 260, and the VNF that is part of the gNB through configuration; and receive a response from EM 235 indicating the relation has been established.

Example 6 may include the EM 235 of example 5 and/or some other examples herein, wherein upon receiving the request from NM 215 establish the relation between the VNF that is part of the CN 260, and the VNF that is part of the gNB through configuration, EM is configured to: configure the VNF that is part of the CN 260, and the VNF that is part of the gNB to establish the relation; and send a response to EM 235 indicating that the relation has been established.

Example 7 may include an apparatus comprising means to perform one or more elements of a method described in or related to any of examples 1-6, or any other method or process described herein.

Example 8 may include one or more non-transitory computer-readable media comprising instructions to cause an electronic device, upon execution of the instructions by one or more processors of the electronic device, to perform one or more elements of a method described in or related to any of examples 1-6, or any other method or process described herein.

Example 9 may include an apparatus comprising logic, modules, and/or circuitry to perform one or more elements of a method described in or related to any of examples 1-6, or any other method or process described herein.

Example 10 may include a method, technique, or process as described in or related to any of examples 1-6, or portions or parts thereof.

Example 11 may include an apparatus comprising: one or more processors and one or more computer readable media comprising instructions that, when executed by the one or more processors, cause the one or more processors to perform the method, techniques, or process as described in or related to any of examples 1-6, or portions thereof.

Example 12 may include a method of communicating in a wireless network as shown and described herein.

Example 13 may include a system for providing wireless communication as shown and described herein.

Example 14 may include a device for providing wireless communication as shown and described herein.

Examples also provide an apparatus for instantiating a Network Service containing a Virtualised Network Function that is part of a Core Network 260, and a Virtualised Network Function that is part of a next generation Node B, gNB, comprising: a Network Function Virtualisation Orchestrator, NFVO, 222 operable to: receive a request to instantiate a new Network Service from a Network Manager 215; instantiate the Network Service containing the Virtualised Network Function that is part of the Core Network 260, and the Virtualised Network Function that is part of the gNB; and respond to the Network Manager 215 indicating that the requested new Network Service has been instantiated.

In some examples, the request to instantiate the new Network Service from the Network Manager 215 comprises a Network Service Descriptor, said Network Service Descriptor containing the Virtualised Network Function that is part of the Core Network 260, and the Virtualised Network Function that is part of the gNB.

In some examples, to receive the request to instantiate the new Network Service comprises onboarding the Network Service Descriptor.

In some examples, the apparatus is further configured to: onboard and enable a Virtualised Network Function package for the Virtualised Network Function that is part of the Core Network 260; and onboard and enable a Virtualised Network Function package for the Virtualised Network Function that is part of the gNB.

In some examples, the apparatus further comprises a Centralised Unit that is part of the gNB, wherein the Centralised Unit can be virtualised by using the Virtual Network Function that implements a virtualized part of the gNB.

Some examples further comprise an Element Manager 235 operable to establish or configure a relation between the Virtualised Network Function that is part of the Core Network 260 and the Virtualised Network Function that is part of the gNB.

In some examples, the relation comprises a management configuration to indicate the Virtualised Network Function that is part of the Core Network 260 has a relation with the Virtualised Network Function that is part of the gNB.

In some examples, the Element Manager 235 is further operable to respond to the Network Manager 215 to indicate the relation has been established or configured.

In some examples, the relation is established or configured by the Network Manager 215.

In some examples, the Network Function Virtualisation Orchestrator 222 is further operable to: receive a request from the Network Manager 215 to add Virtualised Network Function Forwarding Graphs; and add Virtualised Network Function Forwarding Graphs including Virtual Links to connect the Virtualised Network Function that is part of the gNB with other Virtualised Network Functions and/or Physical Network Functions in the instantiated Network Service; and respond to the Network Manager 215 to indicate that the Virtualised Network Function Forwarding Graphs have been added.

In some examples, the Virtual Links comprise information including Quality of Service parameters and/or a connectivity type parameter between the Virtualised Network Functions and/or Physical Network Functions in the instantiated Network Service.

Examples provide one or more non-transitory computer-readable media comprising instructions to cause an electronic device, upon execution of the instructions by one or more processors of the electronic device, to perform one or more elements of a method for instantiating a Network Service containing a Virtualised Network Function that is part of a Core Network 260, and a Virtualised Network Function that is part of a next generation Node B, gNB, comprising: receiving a request to instantiate a new Network Service from a Network Manager 215; instantiating the Network Service containing the Virtualised Network Function that is part of the Core Network 260, and the Virtualised Network Function that is part of the gNB; and responding to the Network Manager 215 indicating that the requested new Network Service has been instantiated.

In some examples the request to instantiate the new Network Service from the Network Manager 215 comprises a Network Service Descriptor, said Network Service Descriptor containing the Virtualised Network Function that is part of the Core Network 260, and the Virtualised Network Function that is part of the gNB.

In some examples receiving the request to instantiate the new Network Service comprises onboarding the Network Service Descriptor.

In some examples the method further comprises: onboarding and enabling a Virtualised Network Function package for the Virtualised Network Function that is part of the Core Network 260; and onboarding and enabling a Virtualised Network Function package for the Virtualised Network Function that is part of the gNB.

In some examples the method further comprises virtualizing a Centralised Unit that is part of the gNB by using the Virtual Network Function that implements a virtualized part of the gNB.

In some examples the method further comprises establishing or configuring a relation between the Virtualised Network Function that is part of the Core Network 260 and the Virtualised Network Function that is part of the gNB.

In some examples the relation comprises a management configuration to indicate the Virtualised Network Function that is part of the Core Network 260 has a relation with the Virtualised Network Function that is part of the gNB.

In some examples the method further comprises responding to the Network Manager 215 to indicate the relation has been established or configured.

In some examples the relation is established or configured by the Network Manager 215.

In some examples the method further comprises: receiving a request from the Network Manager 215 to add Virtualised Network Function Forwarding Graphs; and adding Virtualised Network Function Forwarding Graphs including Virtual Links to connect the Virtualised Network Function that is part of the gNB with other Virtualised Network Functions and/or Physical Network Functions in the instantiated Network Service; and responding to the Network Manager 215 to indicate that the Virtualised Network Function Forwarding Graphs have been added.

In some examples the Virtual Links comprise information including Quality of Service parameters and/or a connectivity type parameter between the Virtualised Network Functions and/or Physical Network Functions in the instantiated Network Service.

Examples also provide an apparatus for instantiating a Network Service containing a Virtualised Network Function that is part of a Core Network 260, and a Virtualised Network Function that is part of a next generation Node B, gNB, comprising: a Network Manager 215 operable to: send a request to instantiate a new Network Service to a Network Function Virtualisation Orchestrator, NFVO, 222; and receive a response from the Network Function Virtualisation Orchestrator 222 indicating that the requested new Network Service has been instantiated.

In some examples, the request to instantiate the new Network Service to the Network Function Virtualisation Orchestrator 222 comprises a Network Service Descriptor, said Network Service Descriptor containing the Virtualised Network Function that is part of the Core Network 260, and the Virtualised Network Function that is part of the gNB.

Some examples further comprise an Element Manager 235 operable to establish or configure a relation between the Virtualised Network Function that is part of the Core Network 260 and the Virtualised Network Function that is part of the gNB.

In some examples, the relation comprises a management configuration to indicate the Virtualised Network Function that is part of the Core Network 260 has a relation with the Virtualised Network Function that is part of the gNB.

In some examples, the Network Manager 215 is further operable to receive a response from the Element Manager 235 to indicate the relation has been established or configured.

In some examples, the relation is established or configured by the Network Manager 215.

In some examples, the Network Manager 215 is further operable to: send a request to the Network Function Virtualisation Orchestrator 222 to add Virtualised Network Function Forwarding Graphs; and receive a response from the Network Function Virtualisation Orchestrator 222 to indicate that the Virtualised Network Function Forwarding Graphs have been added.

Examples provide one or more non-transitory computer-readable media comprising instructions to cause an electronic device, upon execution of the instructions by one or more processors of the electronic device, to perform one or more elements of a method for instantiating a Network Service containing a Virtualised Network Function that is part of a Core Network 260, and a Virtualised Network Function that is part of a next generation Node B, gNB, comprising: sending a request to instantiate a new Network Service to a Network Function Virtualisation Orchestrator 222; and receiving a response from the Network Function Virtualisation Orchestrator 222 indicating that the requested new Network Service has been instantiated.

In some examples the request to instantiate the new Network Service sent to the Network Function Virtualisation Orchestrator 222 comprises a Network Service Descriptor, said Network Service Descriptor containing the Virtualised Network Function that is part of the Core Network 260, and the Virtualised Network Function that is part of the gNB.

In some examples the method further comprises establishing or configuring a relation between the Virtualised Network Function that is part of the Core Network 260 and the Virtualised Network Function that is part of the gNB.

In some examples the relation comprises a management configuration to indicate the Virtualised Network Function that is part of the Core Network 260 has a relation with the Virtualised Network Function that is part of the gNB.

In some examples the method further comprises receiving a response from the Element Manager 235 to indicate the relation has been established or configured.

In some examples the relation is established or configured by the Network Manager 215.

In some examples the method further comprises: sending a request to the Network Function Virtualisation Orchestrator 222 to add Virtualised Network Function Forwarding Graphs; and receiving a response from the Network Function Virtualisation Orchestrator 222 to indicate that the Virtualised Network Function Forwarding Graphs have been added.

Examples also provide methods corresponding to the above-described non-transitory computer-readable media based methods.

In the foregoing, the interface names, and the names of the entities involved, are only exemplary and are descriptive of the logical entities involved in the communications over the respectively named interfaces.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. An apparatus for instantiating a Network Service comprising a Virtualised Network Function that is part of a Core Network, and a Virtualised Network Function that is part of a next generation Node B, gNB, comprising:
   memory having instructions; and
   processing circuitry, coupled with the memory, to implement a Network Function Virtualisation Orchestrator to:
   receive a request to instantiate a new Network Service from a Network Manager;
   instantiate the new Network Service comprising a first Virtualised Network Function that is part of the Core Network, and a second Virtualised Network Function that corresponds to a centralized unit that is part of the gNB;

respond to the Network Manager indicating that the new Network Service has been instantiated;

receive a request from the Network Manager to add Virtualised Network Function Forwarding Graphs associated with the instantiated Network Service;

in response to the request, add Virtualised Network Function Forwarding Graphs associated with the instantiated Network Service, including adding one or more Virtual Links to connect the second Virtualised Network Function corresponding to the Centralized Unit that is part of the gNB with one or more Physical Network Functions that correspond to one or more Distributed Units that are part of the gNB; and respond to the Network Manager to indicate that the Virtualised Network Function Forwarding Graphs have been added.

2. The apparatus of claim 1, wherein the request to instantiate the new Network Service from the Network Manager comprises a Network Service Descriptor, said Network Service Descriptor comprising the first Virtualised Network Function that is part of the Core Network, and the second Virtualised Network Function that is part of the gNB.

3. The apparatus of claim 2, wherein to receive the request to instantiate the new Network Service comprises onboarding the Network Service Descriptor.

4. The apparatus of claim 1, wherein the processing circuitry is further to:

onboard and enable a Virtualised Network Function package for the first Virtualised Network Function that is part of the Core Network; and onboard and enable a Virtualised Network Function package for the second Virtualised Network Function that is part of the gNB.

5. The apparatus of claim 4, wherein the processing circuitry is to further implement an Element Manager to establish or configure a relation between the first Virtualised Network Function that is part of the Core Network and the second Virtualised Network Function that is part of the gNB.

6. The apparatus of claim 5, wherein the relation comprises a management configuration to indicate the first Virtualised Network Function that is part of the Core Network has a relation with the second Virtualised Network Function that is part of the gNB.

7. The apparatus of claim 5, wherein the Element Manager is further operable to respond to the Network Manager to indicate the relation has been established or configured.

8. The apparatus of claim 5, wherein the relation is established or configured by the Network Manager.

9. The apparatus of any of claim 1, wherein the Centralized Unit that is part of the gNB, is implemented using the second Virtual Network Function.

10. The apparatus of claim 1, wherein the Virtual Links comprise information including one or more of Quality of Service parameters or a connectivity type parameter between one or more of the Virtualised Network Functions or the Physical Network Functions in the instantiated Network Service.

11. One or more non-transitory, computer-readable media comprising instructions to cause an electronic device, upon execution of the instructions by one or more processors of the electronic device, to perform one or more operations for instantiating a Network Service comprising a Virtualised Network Function that is part of a Core Network, and a Virtualised Network Function that is part of a next generation Node B, gNB, the operations comprising:

sending a request to instantiate a new Network Service to a Network Function Virtualisation Orchestrator;

receiving a response from the Network Function Virtualisation Orchestrator indicating that the requested new Network Service has been instantiated, the Network Service comprising a first Virtualised Network Function that is part of the Core Network, and a second Virtualised Network Function that corresponds to a centralized unit that is part of the gNB;

sending a request to the Network Function Virtualisation Orchestrator to add Virtualised Network Function Forwarding Graphs associated with the instantiated Network Service, including adding one or more Virtual Links to connect the second Virtualised Network Function corresponding to the Centralized Unit that is part of the gNB with one or more Physical Network Functions that correspond to one or more Distributed Units that are part of the gNB; and receiving a response from the Network Function Virtualisation Orchestrator indicating that the Virtualised Network Function Forwarding Graphs have been instantiated.

12. The non-transitory, computer-readable media of claim 11, wherein the request to instantiate the new Network Service sent to the Network Function Virtualisation Orchestrator comprises a Network Service Descriptor, the Network Service Descriptor comprising the first Virtualised Network Function that is part of the Core Network, and the second Virtualised Network Function that is part of the gNB.

13. The non-transitory, computer-readable media of claim 11, wherein the operations further comprise establishing or configuring a relation between the first Virtualised Network Function that is part of the Core Network and the second Virtualised Network Function that is part of the gNB.

14. The non-transitory, computer-readable media of claim 13, wherein the relation comprises a management configuration to indicate that the first Virtualised Network Function that is part of the Core Network has a relation with the second Virtualised Network Function that is part of the gNB.

15. The non-transitory, computer-readable media of claim 13, wherein the relation is established or configured by a Network Manager.

16. A Network Management apparatus comprising:

interface circuitry; and one or more processors, coupled with the interface circuitry, to perform operations comprising:

sending a request to a Network Function Virtualisation Orchestrator to instantiate a Network Service comprising a first Virtualised Network Function that is part of a Core Network and a second Virtualised Network Function that corresponds to a Centralized Unit that is part of a next generation Node B (gNB);

receiving a response from the Network Function Virtualisation Orchestrator indicating that the Network Service has been instantiated;

sending a request to the Network Function Virtualisation Orchestrator to add Virtualised Network Function Forwarding Graphs associated with the instantiated Network Service, including adding one or more Virtual Links to connect the second Virtualised Network Function corresponding to the Centralized Unit that is part of the gNB with one or more Physical Network Functions that correspond to one or more Distributed Units that are part of the gNB; and receiving a response from the Network Function Virtualisation Orchestrator indicating that the Virtualised Network Function Forwarding Graphs have been instantiated.

17. The Network Management apparatus of claim 16, wherein the request to instantiate the Network Service sent to the Network Function Virtualisation Orchestrator comprises a Network Service Descriptor, the Network Service Descriptor comprising the first Virtualised Network Function that is part of the Core Network, and the second Virtualised Network Function that is part of the gNB.

18. The Network Management apparatus of claim 16, wherein instantiating the Virtualised Network Function Forwarding Graphs comprise configuring a relation between the first Virtualised Network Function that is part of the Core Network and the second Virtualised Network Function that is part of the gNB.

19. The Network Management apparatus of claim 18, wherein the relation comprises a management configuration to indicate that the first Virtualised Network Function that is part of the Core Network has a relation with the second Virtualised Network Function that is part of the gNB.

20. The Network Management apparatus of claim 18, wherein the relation is configured by a Network Manager.

\* \* \* \* \*